United States Patent
Guim Bernat et al.

(10) Patent No.: US 12,430,125 B2
(45) Date of Patent: Sep. 30, 2025

(54) IMPLEMENTATION OF OBJECT VERSIONING AND CONSISTENCY AT SCALE

(71) Applicant: Intel Corporation, Santa Clara, CA (US)

(72) Inventors: Francesc Guim Bernat, Barcelona (ES); Karthik Kumar, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 784 days.

(21) Appl. No.: 17/546,033

(22) Filed: Dec. 8, 2021

(65) Prior Publication Data
US 2022/0100498 A1    Mar. 31, 2022

(51) Int. Cl.
G06F 8/71    (2018.01)

(52) U.S. Cl.
CPC ..................... G06F 8/71 (2013.01)

(58) Field of Classification Search
CPC ....................................................... G06F 8/71
See application file for complete search history.

(56) References Cited

U.S. PATENT DOCUMENTS

| | | | |
|---|---|---|---|
| 7,693,881 B2* | 4/2010 | Fischer | G06F 9/526 707/704 |
| 8,261,085 B1* | 9/2012 | Fernandez | G06F 21/565 711/119 |
| 8,688,991 B1* | 4/2014 | Sunil | H04N 21/26613 713/176 |
| 8,825,599 B2* | 9/2014 | Goldberg | G06Q 10/06 707/634 |
| 10,277,608 B2* | 4/2019 | Krishnamurthy | H04L 63/123 |
| 10,318,272 B1* | 6/2019 | Manuilov | H04L 67/06 |
| 2017/0249483 A1* | 8/2017 | Kawazu | G06F 21/64 |
| 2019/0109711 A1* | 4/2019 | Gladwin | H04L 9/0869 |
| 2020/0382309 A1* | 12/2020 | Jayachandran | H04L 9/3297 |
| 2021/0117555 A1* | 4/2021 | Bernat | H04L 9/30 |
| 2021/0192038 A1* | 6/2021 | Shibata | G06F 21/44 |
| 2021/0263746 A1* | 8/2021 | Thom | G06F 3/0685 |
| 2021/0373768 A1* | 12/2021 | Padala | H04L 69/04 |
| 2022/0027138 A1* | 1/2022 | Stevens | G06F 8/65 |

FOREIGN PATENT DOCUMENTS

| | | |
|---|---|---|
| CN | 116243959 A | 6/2023 |
| DE | 102022129468 A1 | 6/2023 |

\* cited by examiner

*Primary Examiner* — Douglas M Slachta
(74) *Attorney, Agent, or Firm* — JAFFERY WATSON HAMILTON & DESANCTIS LLP

(57) ABSTRACT

Implementation of object versioning and consistency at scale is described. An example of a computer-readable storage medium includes instructions to receive a storage request from an object management authority to store a version of a data object at a storage appliance; generate a hash value of the data object; store the data object in a scratchpad storage; transmit a verification request for the hash value of the data object to an object versioning authority; and, upon receiving affirmative verification for the hash value, move the data object from the scratchpad storage to a media storage and transmit an acknowledgement to the object management authority.

20 Claims, 11 Drawing Sheets

EXAMPLES OF CONSISTENCY CHOICES

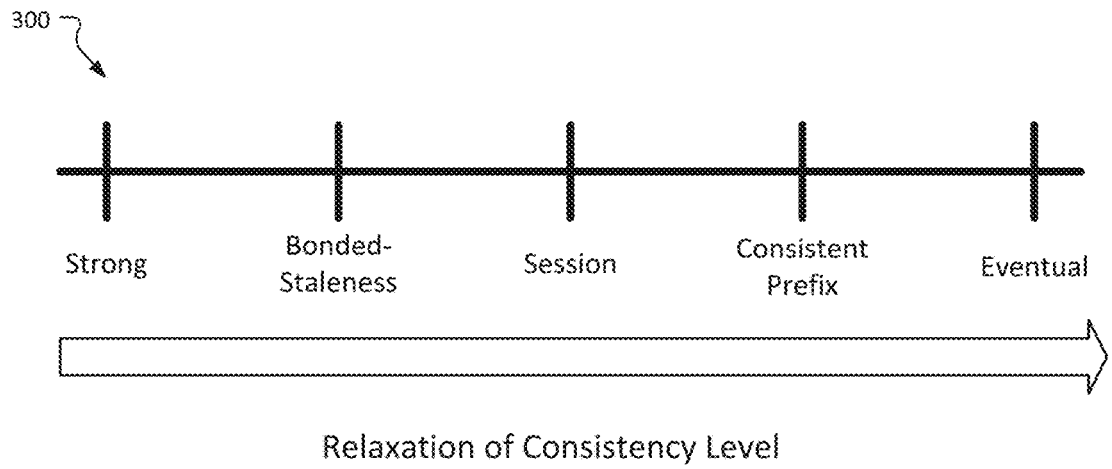

FIG. 3A

| Consistency Level | Guarantees |
|---|---|
| Strong | Linearizability |
| Bounded Staleness | Consistent Prefix – Reads lag behind writes by $k$ prefixes or $t$ interval |
| Session | Consistent Prefix – Monotonic reads, monotonic writes, read-your-writes, write-follows-read |
| Consistent Prefix | Updates returned are some prefix of all of the updates, with no gaps |
| Eventual | Out of order reads |

IMPLEMENTATION OF OBJECT VERSIONING AND CONSISTENCY AT SCALE

TECHNICAL FIELD

This disclosure generally relates to the field of computing devices and, more particularly, implementation of object versioning and consistency at scale.

BACKGROUND

Versioning is a common means to handle updates to distributed software. The key concept behind versioning approaches is to retain the benefits of locking, while enabling more concurrency, which is achieved by providing multiple versions of data that are "consistent". In such technology, a new version of data is created when written to, with the data receiving an appropriate timestamp, such that reading can proceed while writes are occurring. Reads continue with the current consistent version. In this manner, reading and writing operations don't act to block each other.

BRIEF DESCRIPTION OF THE DRAWINGS

Embodiments described here are illustrated by way of example, and not by way of limitation, in the figures of the accompanying drawings in which like reference numerals refer to similar elements.

FIGS. 3A and 3B illustrate examples of consistency choices in a system;

DETAILED DESCRIPTION

Figure 1:
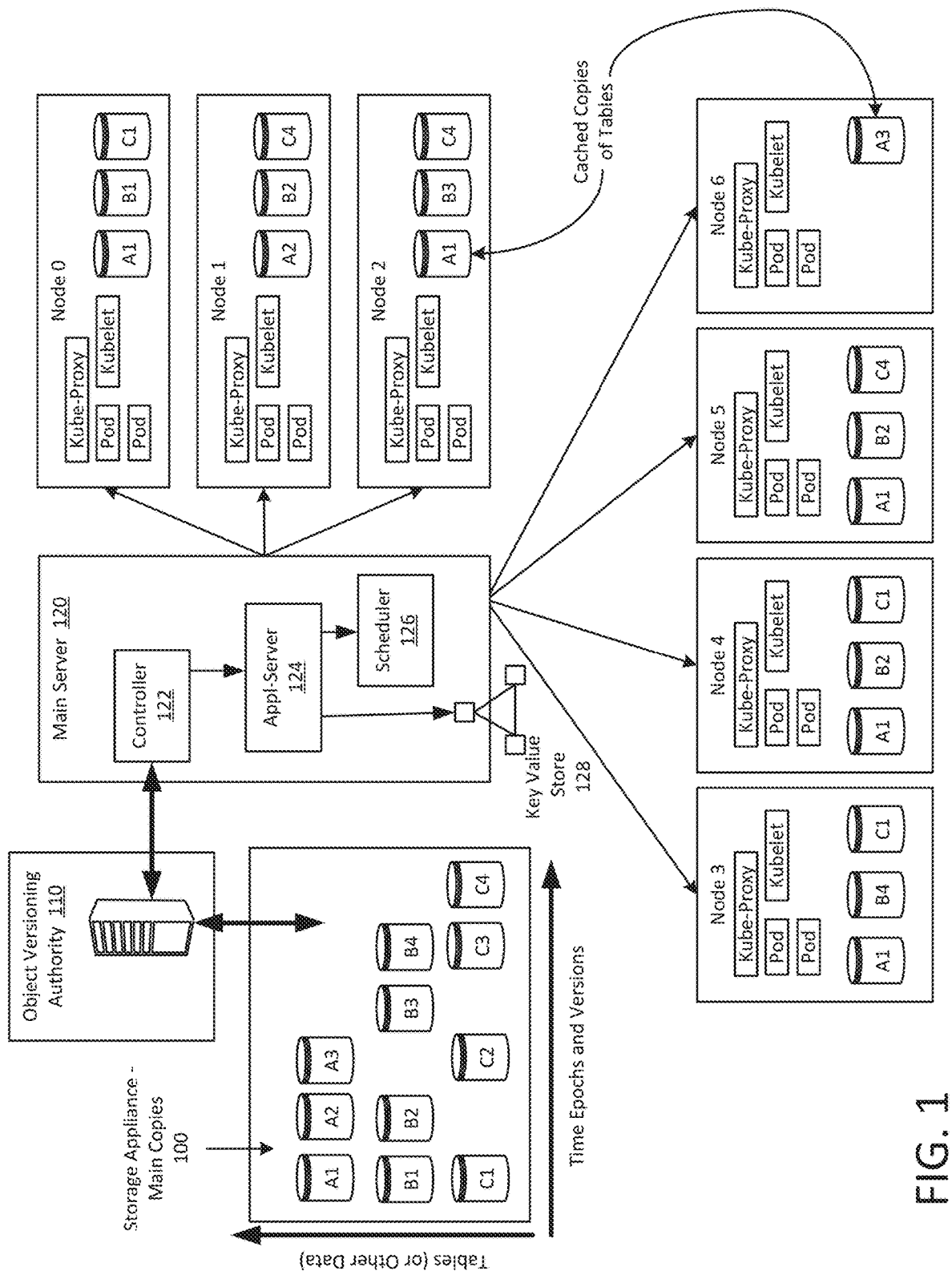
FIG. 1 illustrates a distributed database including multiple version concurrency control, according to some embodiments.

Embodiments described herein are directed to implementation of object versioning and consistency at scale.

In modern computing operations, tables and other data elements may be utilized by different users in many physical locations. However, the data elements will commonly be updated over time. Versioning may be applied to handle the updates to multiple computing systems, wherein versioning refers to establishing different versions of a data element. For example, a particular table may have numerous versions that have been generated and are presented in different locations, and the version of a particular instance of the table informs a system regarding how up-to-date the instance is.

However, versioning becomes increasingly difficult as a computing environment is scaled upward, such in a cloud environment in which there are a large number of nodes, which may include hundreds or more nodes in a particular environment, and an environment that may potentially be spread worldwide. A cloud environment is an environment for the provision of cloud computing, in which computing services are provided over a network connection (or "cloud") on demand. In particular, cloud computing may include provision of computer system resources, such as data storage and computing, without direct active management by a user. The nature of such computing environments have significant effects on data concurrency and data consistency. Data concurrency refers to the ability of multiple users to access data at a same time (i.e., concurrently), while data consistency refers to each of multiple users viewing a consistent view of the data. As further described herein, different implementations may have different requirements with regard to data concurrency and data consistency.

There are several different implementations of versioning that may be used in a computing environment, including multi-version concurrency control (in which timestamps and incremental transaction IDs are used to implement transaction concurrency), blobbing (blob-based storage management systems, which has been implemented by major CSPs (Cloud Solution Providers)), and others. A key concept within such approaches is the goal of retaining the benefits of locking (locking referring to providing exclusive control of a table during certain transactions) while gaining more data concurrency, which is achieved by providing multiple versions of data (which will include differences in data values) that are treated or defined to be "consistent" in a particular implementation. A new version of data is created when a table or other data element is written to, with the table receiving an appropriate timestamp. In this manner, reading can proceed while writes are occurring, with reads continuing with a current "consistent" version. Stated in another way, reading and writing may be performed together (overlapping at least in part) without blocking each other.

In some examples, an apparatus, system, or process is to implement object versioning and consistency at scale through application of hardware to ensure that stored objects are consistent with the origin object that the stored objects represent. Examples are to provide mechanisms to scale object consistency and versioning in distributed systems, thus enabling reduction in total cost of ownership with hardware accelerated storage appliances.

FIG. 1 illustrates a distributed database including multiple version concurrency control, according to some embodiments. As illustrated, a storage appliance 100 provides for storage of main copies of tables (or other data), with there being multiple versions of such tables over time epochs. In this simplified illustration there are three tables, Tables A, B, and C, and a certain number of versions of each table over time. In this particular example, Table A includes versions A1, A2, and A3; Table B includes versions B1, B2, B3, and B4; and Table C includes versions C1, C2, C3, and C4. An object versioning authority 110 operates to generate and maintain the versions of the tables.

As further illustrated, the object versioning authority is coupled with a main server 120, the main server 120 including a controller 122, an application server 124, and a scheduler 126. In an example, the main server may further include a key value store 128 that stores keys and values for various purposes. This particular example illustrates a Kubernetes container orchestration system that provides for automating computer application deployment, scaling, and management. In this system, a Kubernetes cluster includes a set of worker machines, called nodes, that run containerized applications. The worker nodes host pods that are the components of an application workload. In the illustrated example there is a set of individual nodes, illustrated as Node 0 through Node 6, with each including a Kubelet component (an agent running on the node that ensures that containers are running in a pod) and a Kube-Proxy component (a network proxy running on each node to implement a portion of the Kubernetes service operation). However, it is noted that embodiments are not limited to this technology, and may include other types of node operations.

In the illustrated example in FIG. 1, the individual nodes, illustrated as Node 0 through Node 6, include copies of the tables in their local memory, with the storage appliance tracking and maintenance of versioning information via MVCC (Multi Version Concurrency Control). FIG. 1 illustrate tables that exist in memory at one particular point in time, which may change at a later time. Object versioning for the tables is tracked along with time epochs. The latest version of the data is not always present in all the nodes at any time, and this is acceptable for many cases in which the databases have relaxed/eventual consistency requirements. As specifically illustrated in FIG. 1, varying versions of Tables A, B, and C may exist at each node, such as Node 0 includes table versions A1, B1, and C1, while Node 1 includes table versions A2, B2, and C4.

Figure 2:
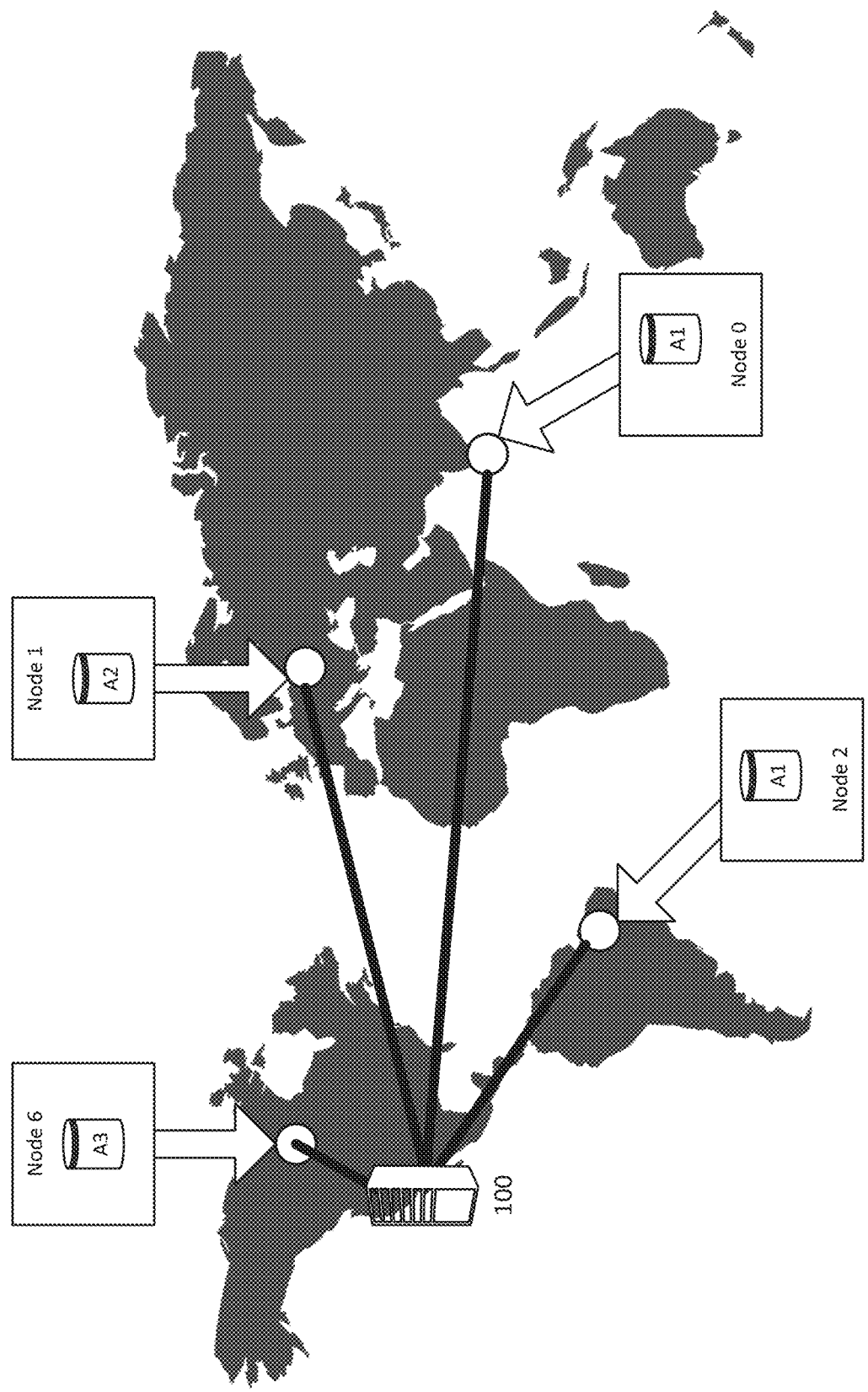
FIG. 2 is an example of nodes in separate physical locations in a computing environment, according to some embodiments.

It is noted that the nodes may be separated physically, which may affect which version is available in each node. FIG. 2 is an example of nodes in separate physical locations in a computing environment, according to some embodiments. As illustrated, Nodes 0, 1, 2, and 6 may be separated in different continents, with all such nodes being some distance from the main copies 100 of the tables. In this example at a particular point in time, Node 6 has stored A3 (the latest version of Table A in this example) while Node 1 has stored A2, and Nodes 0 and 2 have stored A1.

In one example, an e-commerce shopping cart checkout may have no strong consistency requirement during the "add to cart" shopping phase (such that, for example, a user can potentially see N number of an item X available, and add all N to the cart even though other users may be accessing the same items for purchases), but the consistency requirement is then fully enforced (strong consistency) when the shopping cart is checked out (at which time a user will be notified about the item availability if, for example, another user checked out some subset of the N number of items in the cart in the interim).

FIGS. 3A and 3B illustrate examples of consistency choices in a system. Consistency of data in a cluster of nodes may vary depending on the particular needs and circumstances of each node. The possible consistency schemes may have different types of implementations and requirements, which may include time-epoch based requirements (e.g., provide data that is no longer than X seconds old), condition or rule based (e.g., relaxed consistency during shopping, and strong consistency at time of checkout in a cart), or read-write ordering based.

As shown in FIGS. 3A and 3B, consistency schemes 300 may include, but are not limited to, Strong consistency in which all nodes see the same version of data (providing linearizability with an ordered list of events); Bounded Staleness consistency in which a data version is required to be withing certain bounds (providing a consistent prefix with reads that can lag behind writes only a certain k prefixes (referring to version numbers) or a certain t time interval); Session consistency (providing a consistent prefix with monotonic reads, monotonic writes, read-your-writes, and write-follows-read); Consistent Prefix consistency (providing updates returned being some prefix of all of the updates, with no gaps); and Eventual consistency (allowing out of order reads).

As scale-out for a wide variety of databases becomes the norm, there is immense focus on obtaining solutions that can scale across data centers. Modern born-in-the-cloud databases (such as Snowflake) may attempt to address this scalability problem through various implementations in software management, propagation, and flexibility with user-specified conditions. However, software solutions are limited in ability to scale to larger computing environments because of the intense processing that is required.

In some examples, distributed object versioning and scalability is addressed utilizing a hardware focused approach. The performance of applicable operations, such as version hash computation (hash computation being used to, for example, determine that different versions of a table that come in from different nodes differ), authentication flows, and others, can be greatly enhanced through implementation of hardware hooks. Offloading of some primitives to hardware in storage appliances enables much greater scalability. Further, scaling up the versioning process enables fine grained write logging capability, which in turn can improve distributed object scalability in the cloud.

In some examples, a pooled storage architecture (for example, NVMe (Non-Volatile Memory express) over Fabrics NVMe-oF) is extended and further incorporates a hardware scheme responsible for guaranteeing that a data object stored in the hardware appliance (and potentially multiple versions of the objects) are consistent with the origin object that they store. In some examples, the storage architecture includes the following elements:

(1) An external trusted entity (such as a server), referred to herein as an object versioning authority, is provided to validate that a particular object with a particular hash corresponds to an object with a particular ID and version ID.

(2) When an entity creates an object and subsequent versions of the object, the entity is responsible for updating the external trusted entity with the object versions and the hashes that correspond to each object version.

(3) Objects that are created by a particular entity may be copied over time into different data centers or edge appliances. For instance, a cloud native service stored in a central repository may be propagated across different data centers over time by other entities (e.g. users or software stacks).

(4) Data centers in a cluster include a new pooled version storage appliance that is responsible for validating that objects stored in media via (3) are consistent with respect to (2) versions of the object. When an object is being stored in a local storage appliance, the storage appliance is responsible to validate using (1) to determine that the object is valid. Objects that are not validated by (1) are not stored in the local storage.

(5) Any user or software stack running in the data center may access objects that are stored in the pooled storage that have been previously validated. Hence, no hash computation or validation is required for such access.

Figure 4:
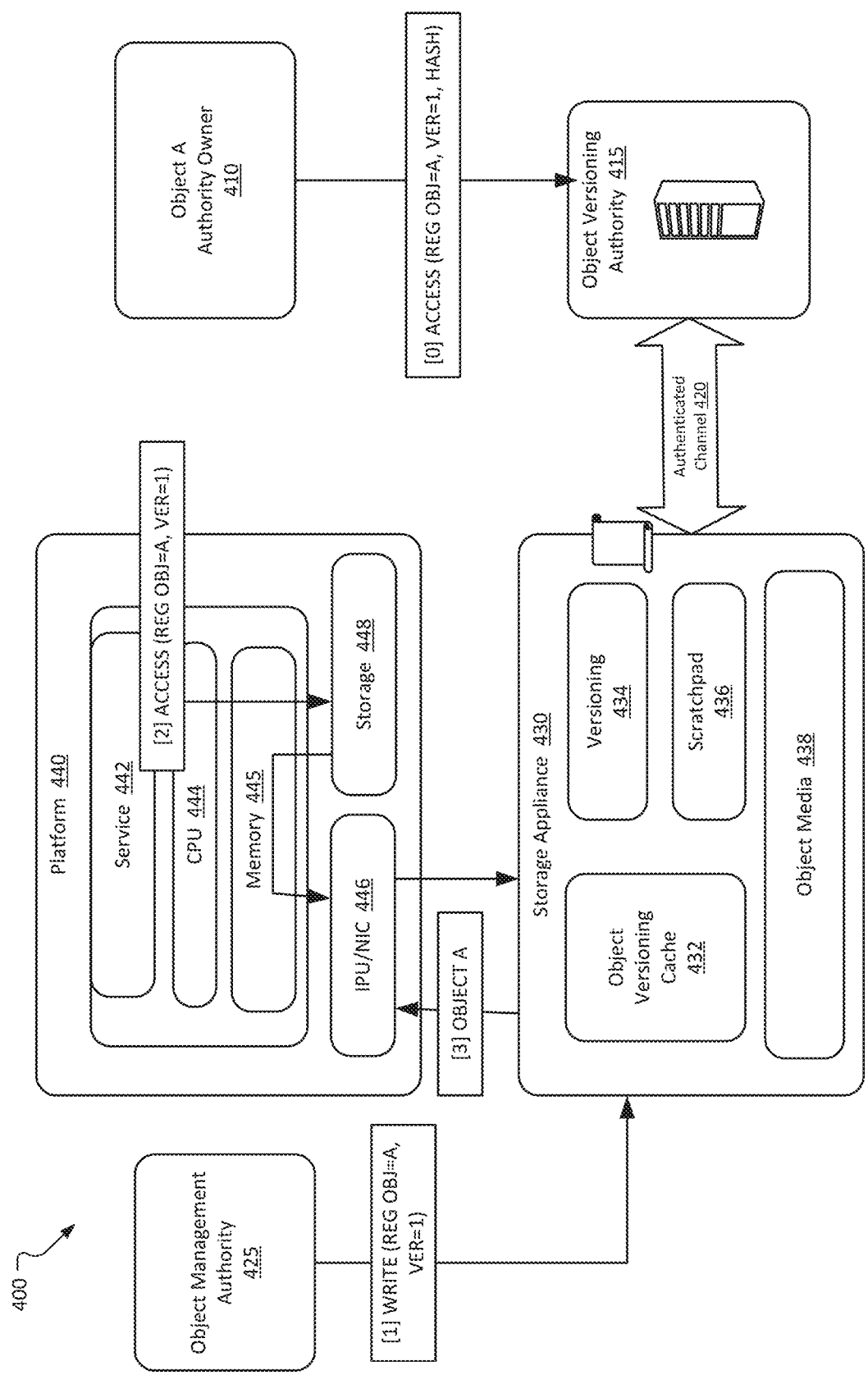
FIG. 4 illustrates a storage architecture to provide object versioning and consistency, according to some embodiments.

FIG. 4 illustrates a storage architecture to provide object versioning and consistency, according to some embodiments. A system architecture 400 includes an object management authority 425 and object versioning authority coupled with a storage appliance 430. As illustrated in FIG. 4, the storage appliance 430 includes:

(a) An object versioning cache 432, wherein the object versioning cache 432 stores all the objects that are being stored in the storage appliance 430 and their corresponding version information. Contents of the object versioning cache 432 may be as further illustrated in FIG. 5.

(b) An object media 438, which is the media to physically store the objects that have been stored in the storage appliance 430. The object media 438 may be, for example, one or more of SSDs (Solid State Devices), NVM (Non-Volatile Memory), HDD (Hard Disk Drive), or any other type of storage device.

(c) A scratchpad media 436 to provide for temporary storage of data objects during storage and verification operations. The scratchpad media 436 may be, for example, a separate SSD or a small amount of storage within a storage device.

(d) Versioning component including circuitry 434, the versioning component 434 being responsible for implementing consistency checking flows when objects are stored or updated. In some embodiments, when there is a request to store a particular object with a particular ID and a particular version, the versioning component is to: (i) Perform a hash computation for the object, such as performance on inline hash computation as the object is being provided by the entity asking to store the object (such as the object management authority 425); (ii) Store the object temporarily in the scratchpad media; (iii) Upon the hash computation being completed, contact the external trusted entity (such as object versioning authority 415) to validate that the hash that is computed corresponds to the object with a UUID and the version. In an affirmative case, the object is moved from the scratchpad media 436 to the object media 438, and an acknowledgement (ACK) is transmitted back to the object management authority 425. In a negative case, a negative acknowledgement (NACK) is transmitted back to the object management authority 425.

The storage appliance is coupled with the object versioning authority 415 via an authenticated channel 420. The object versioning authority 415 is a trusted entity (such as a server) that is operable to validate that a particular object with a particular hash corresponds to an object with a particular ID and version ID.

The object versioning authority 415 is responsible for providing application programming interfaces (APIs) to manage the life cycle management of one or more objects. The object versioning authority 415 provides the following main interfaces:

(1) Registering a new object: Any entity that is trusted or that the entity managing the object versioning can authenticate can register a new object, such as Object A in the example shown in FIG. 4. To register a new object the following parameters may be required: (a) UUID (Universally Unique Identifier) for the object ID; (b) Version of the object; (c) The object to be registered; and (d) Metadata for the object, which may include entities that can update the object, priority for the object, etc.

(2) Updating a new object: A trusted entity then can update a particular object, providing (a) The UUID for the object ID; (b) The Version of the object; and (c) The updated object.

In the illustrated example in FIG. 4, when entity such as the illustrated Object A authority owner 410 creates Object A and subsequent versions of Object A, the Object A authority owner 410 is responsible for updating the object versioning authority 415 with hashes that correspond to each object version. As shown in FIG. 4, Object A authority owner 410 provides the object versioning authority 415 with ACCESS (REG OBJ=A, V=1, HASH), indicating the provision of Version 1 of Object A and the Hash of such version. It is then the responsibility of the object owner 410 to keep the central object versioning authority 415 up to date with new versions and hashes of the object (Object A in this instance) as these new versions are created.

Objects that are created by a particular entity may be copied over time into different data centers or edge appliances. For instance, a cloud native service stored in a central repository may be propagated across different data centers over time by other entities (e.g. users or software stacks). In some examples, the storage appliance 430 is a pooled version storage appliance that is responsible for validating that objects stored in media (the object media 438) are consistent. When objects are being stored in a local appliance, the storage appliance 430 is responsible validating that the object is valid. Objects that are not validated by the storage appliance 430, as described above, are not stored in the local storage. Any user or software stack running in the data center having access to objects stored in this pooled storage (the storage appliance 430) have knowledge that the objects have been previously validated, and thus no hash computation or validation is required.

In an example, in the context of a cloud native operation, the storage appliance 430 may be hosted in a data center, and may store different containers and micro-services that are cached from a central repository (e.g., a. docker hub). A service owner may store a new version for an object (such as Object A) into the docker hub. At some point in time a party from the data center may wish to store the new version into the storage appliance 430. As illustrated, the object management authority 425 requests to store Version 1 of Object A in the storage appliance 430—WRITE (REG OBJ-A, VER=1). The storage appliance 430, using the version ID and the object ID for Object A, communicates with the object versioning authority 415 to validate that an object hash generated for Object A corresponds to the correct object and version according to the object versioning authority 415. In an affirmative case, the new version of the object will be stored in the storage appliance 430 (in object media 438). Otherwise, the object is rejected.

In a particular example, the storage appliance 430 is further coupled with a particular platform system 440. The platform system may include one or more processors including a central processing unit (CPU) 444, a memory 445, an interface (e.g. IPU/NIC (Infrastructure Processing Unit/Network Interface Controller)) 446 to provide a connection with the storage appliance 430, and a storage 448. The platform 440 includes a service 442. In the example, the service 442 requests access to Version 1 of Object A—ACCESS (REG OBJ=A, VER=1). If the requested version of Object A is not present in storage 448, the platform 440 is to request the object via the interface 446 from the storage appliance 430. The storage appliance 430 is then to return Object A, which has been previously authenticated by the storage appliance 430 via the object versioning authority 415.

In some embodiments, a system or process supports more relaxed consistency in the storage (e.g., where not all updates generate validation) and allows hybrid models where certain objects may not require validation, depending on the particular requirements of a service or system.

Figure 5:
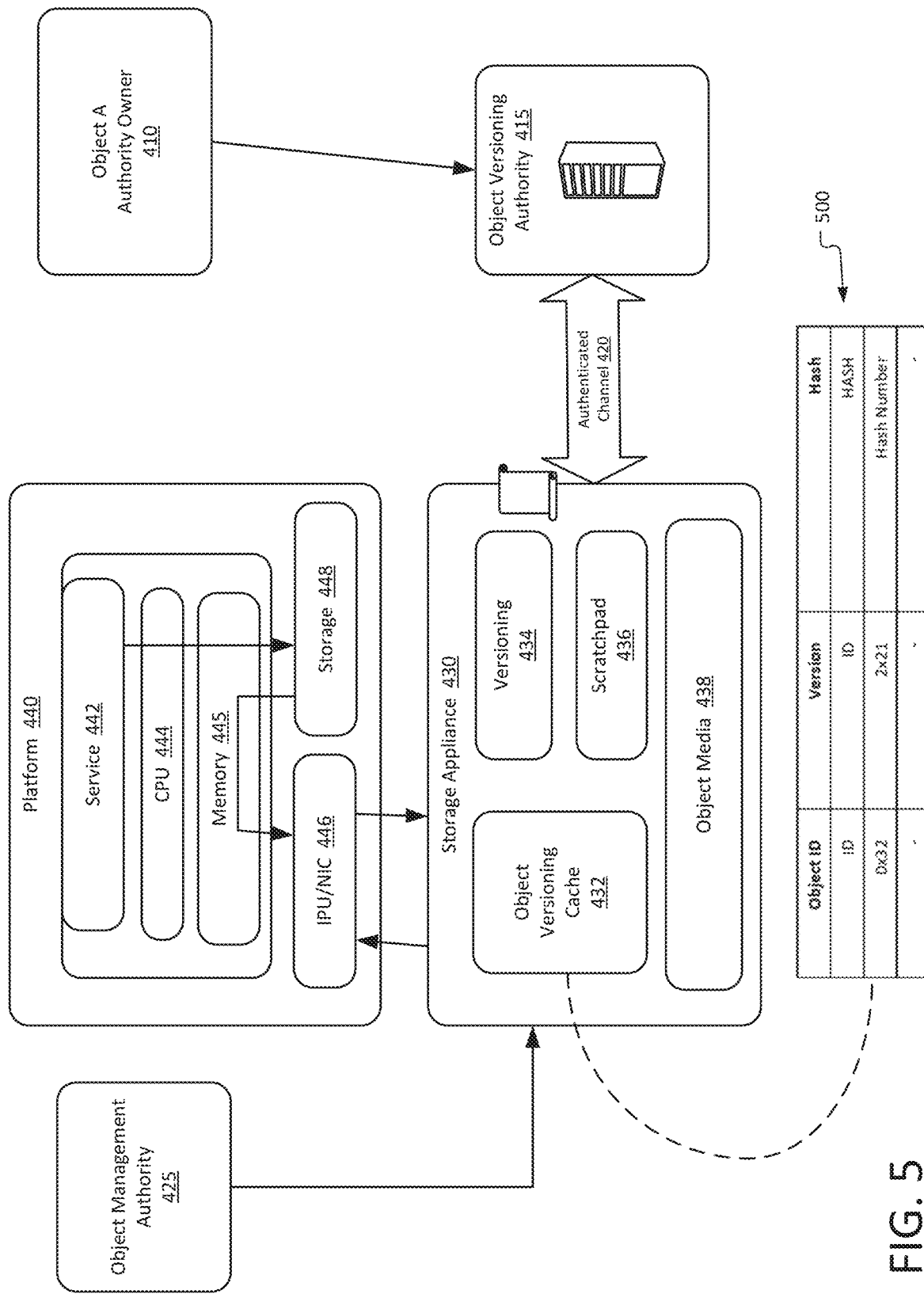
FIG. 5 illustrates a storage architecture to provide object versioning and consistency, according to some embodiments.

FIG. 5 illustrates a storage architecture to provide object versioning and consistency, according to some embodiments. A system architecture 400 includes an object management authority 425 and object versioning authority coupled with a storage appliance 430, as illustrated in FIG. 4. As described with regard to FIG. 4, the storage appliance 430 includes as object versioning cache 432, the object versioning cache 432 storing data for all objects that are being stored in the storage appliance 430.

In some embodiments, the object versioning cache 432 includes a list 500 including:
  (i) Object IDs identifying each object with a corresponding UUID;
  (ii) An Object Version ID identifying the version of each object; and
  (iii) The hash corresponding to the particular object.

Figure 6A:
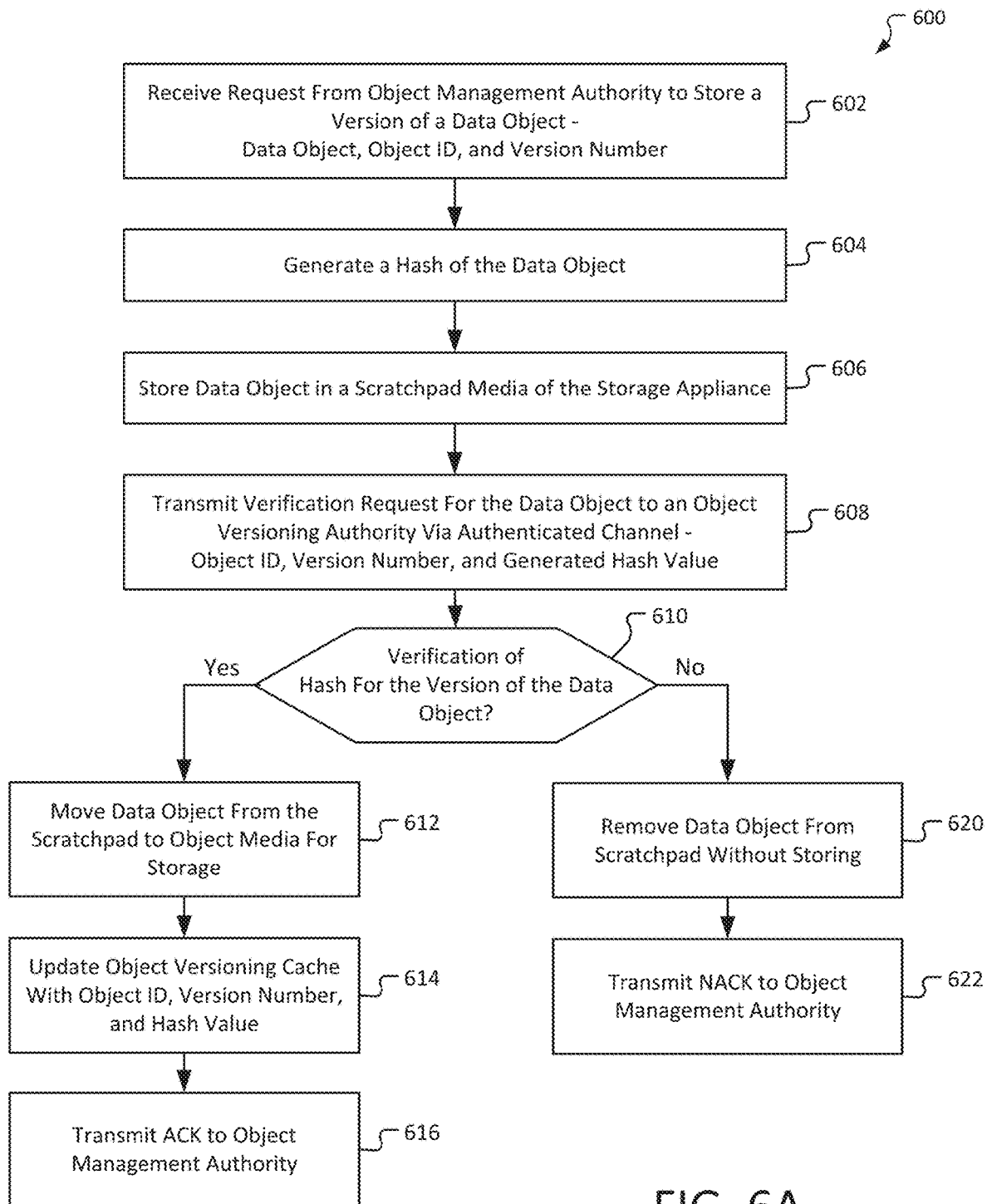
FIG. 6A is a flowchart to illustrate a process for maintaining object versioning and consistency, according to some embodiments.

FIG. 6A is a flowchart to illustrate a process for maintaining object versioning and consistency, according to some embodiments. In a method 600, a request may be received from an object management authority to store a particular version of a data object (such as a table) in a storage appliance 602, the request including the data object, an identification of the data object, and the version of the data object. In some embodiments, the version of the data object may be one of multiple versions of the data object to be stored in the storage appliance. The storage appliance is to is to generate a hash of the object 604, and to store the data object in a scratchpad media of the storage appliance 606, wherein the scratchpad media may include, for example, a separate SSD or a small amount of storage within a storage device.

The storage appliance is then to transmit a verification request for the data object to an object versioning authority 608, wherein the verification request may be sent via an authenticated channel, and wherein the verification request including at least identification for the data object, version number for the data object, and the generated hash value.

Upon receiving affirmative verification indicating that hash corresponds to the version of the data object 610, the data object is moved from the scratchpad to an object media for storage 612; an object versioning cache is updated with an identification for the data object, a version for the data object, and the hash value 614; and an acknowledgement (ACK) is transmitted to the object management authority 616. Upon receiving negative verification indicating that the hash does not correspond to the version of the data object 610, the data object is removed from the scratchpad without storing 620, and a negative acknowledgement (NACK) is sent to the object management authority 622.

Figure 6B:
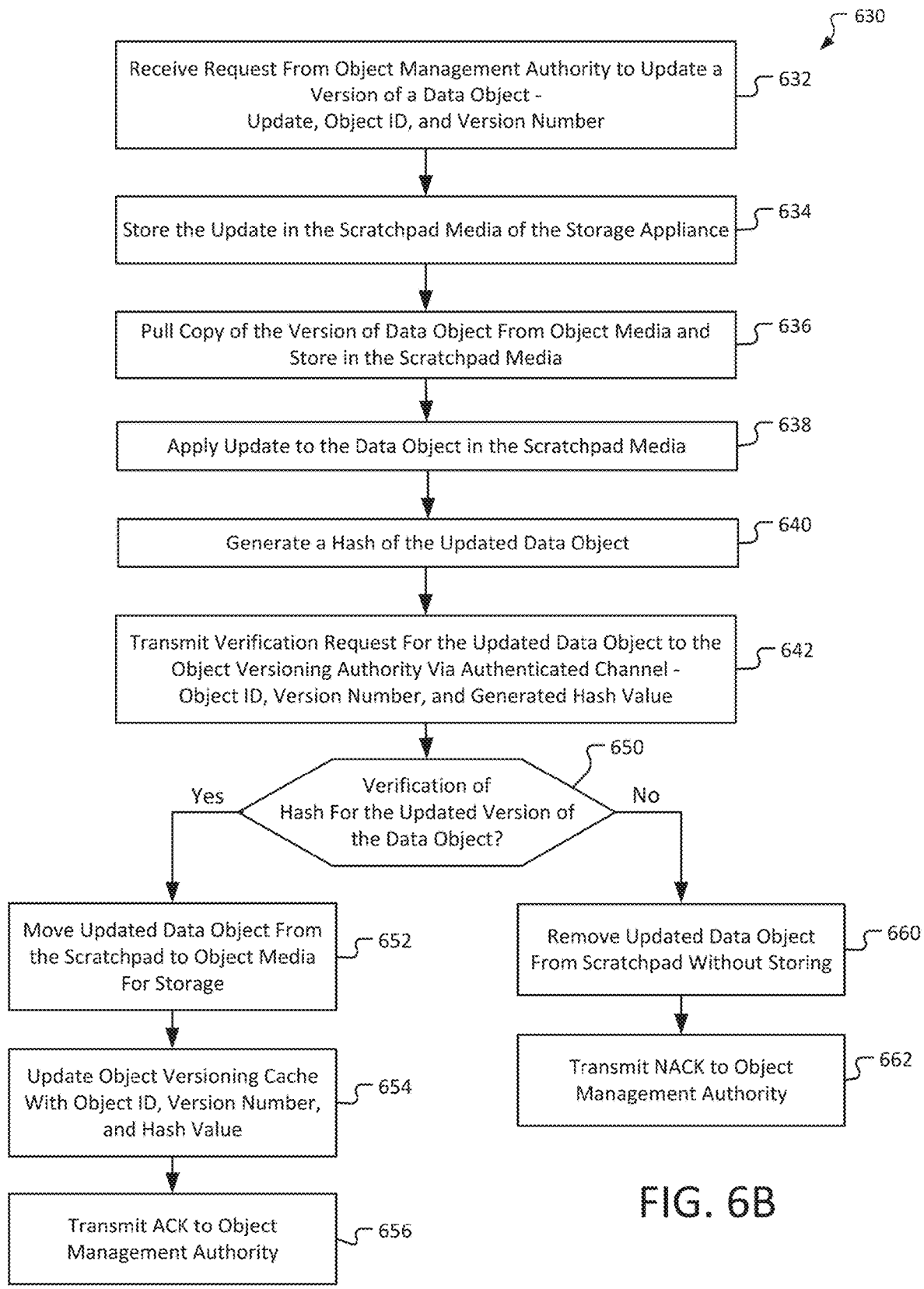
FIG. 6B is a flowchart to illustrate a process for updating a data object to maintain object versioning and consistency, according to some embodiments.

FIG. 6B is a flowchart to illustrate a process for updating a data object to maintain object versioning and consistency, according to some embodiments. In a method 630, a request may be received from an object management authority to store an update to a version of a data object that have been previously stored in a storage appliance 632, the request including the update to the data object, identification of the object, and version of the data object.

In some embodiments, the storage appliance is to store the update in the scratchpad media of the storage appliance 634; copy the version of the data object from the storage appliance and store in the scratchpad media 636; apply the update to the data object in the scratchpad media 638; and generate a hash of the updated data object 640.

The storage appliance is then to transmit a verification request for the updated data object to the object versioning authority 642, wherein the verification request may be sent via the authenticated channel, and wherein the verification request including at least identification for the data object, version number for the data object, and the generated hash value for the updated data object.

Upon receiving affirmative verification indicating that hash for the updated data object corresponds to the version of the data object 650, the updated data object is moved from the scratchpad to the object media for storage 652; the object versioning cache is updated with an identification for the data object, the version for the data object, and the hash value for the updated data object 654; and an ACK is transmitted to the object management authority 656. Upon receiving negative verification indicating that the hash does not correspond to the version of the data object 650, the updated data object is removed from the scratchpad without storing 660, and a NACK is sent to the object management authority 662.

The flowcharts illustrated in FIGS. 6A and 6B may include machine readable instructions for a program for execution by processor circuitry. The program may be embodied in software stored on one or more non-transitory computer readable storage media such as a CD (Compact Disk) or DVD (Digital Video Disk), a hard disk drive (HDD), a solid state drive (SSD), a volatile memory (e.g., Random Access Memory (RAM) of any type, etc.), or a non-volatile memory (e.g., FLASH memory, an HDD, etc.) associated with processor circuitry located in one or more hardware devices. The program or parts thereof may alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Although the example program is described with reference to the flowcharts illustrated in FIGS. 6A and 6B, many other methods of implementing may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA (Field-Programmable Gate Array), an ASIC (Application-Specific Integrated Circuit), a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processing unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

Figure 7:
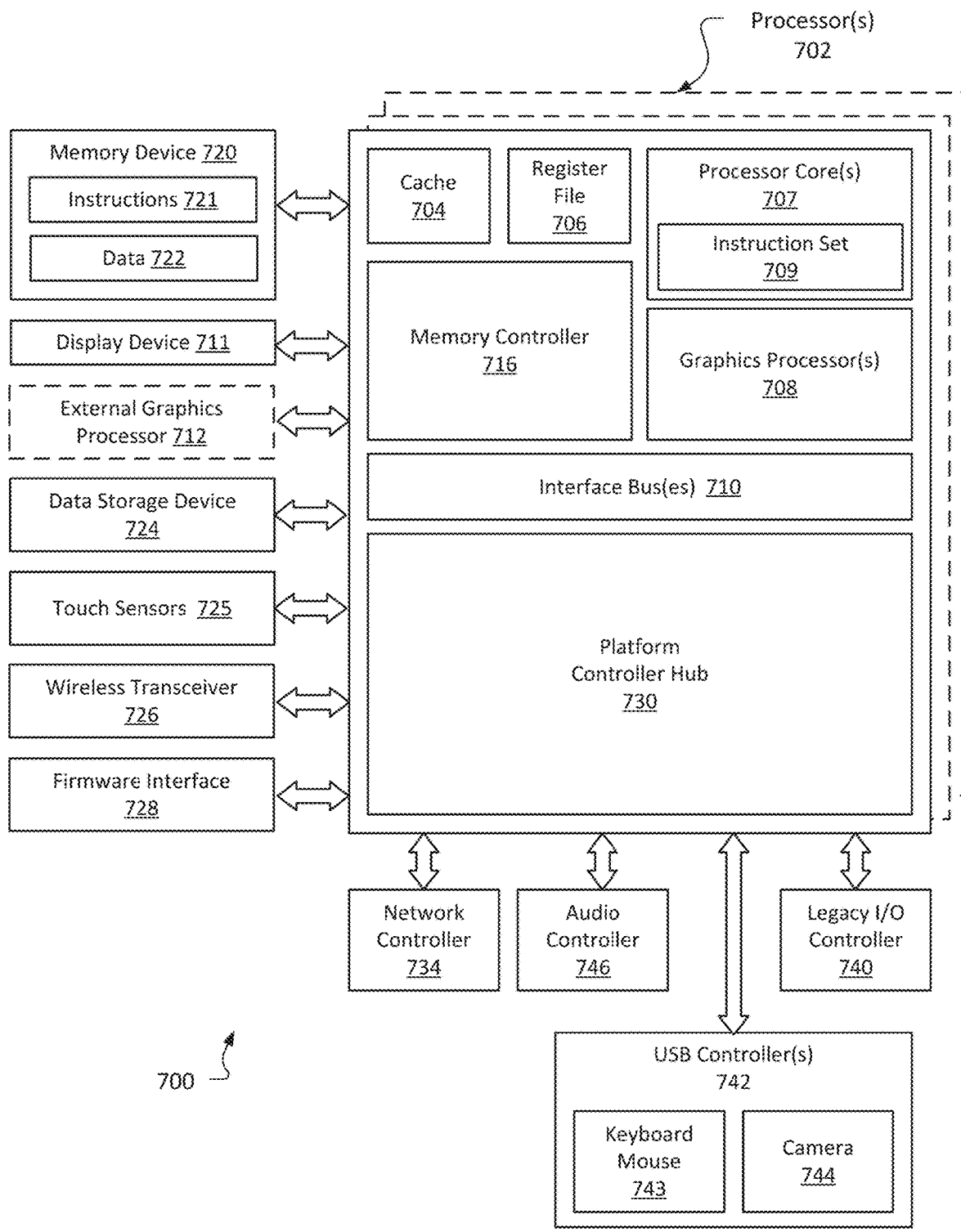
FIG. 7 illustrates an example of a computing architecture for operations including object versioning and consistency, according to some embodiments.

FIG. 7 illustrates an example of a computing architecture for operations including object versioning and consistency, according to some embodiments. In various embodiments as described above, a computing architecture 700 may comprise or be implemented as part of an electronic device.

In some embodiments, the computing architecture 700 may be representative, for example, of a data processing system that implements one or more components of the operating environments described above. The computing architecture 700 may be utilized to provide object versioning and consistency operation, such as described in FIGS. 1-6B.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In one embodiment, the system 700 is a processing platform incorporated within a system-on-a-chip (SoC or SOC) integrated circuit for use in mobile, handheld, or embedded devices.

An embodiment of system 700 can include, or be incorporated within, a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory 704 is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, non-volatile memory device such as flash memory device or phase-change memory device, or some other memory device having suitable performance to serve as process memory. Memory device 720 may further include non-volatile memory elements for storage of firmware. In one embodiment the memory device 720 can operate as system memory for the system 700, to store data 722 and instructions 721 for use when the one or more processors 702 execute an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device, or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, Long Term Evolution (LTE), or 5G transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

Figure 8:
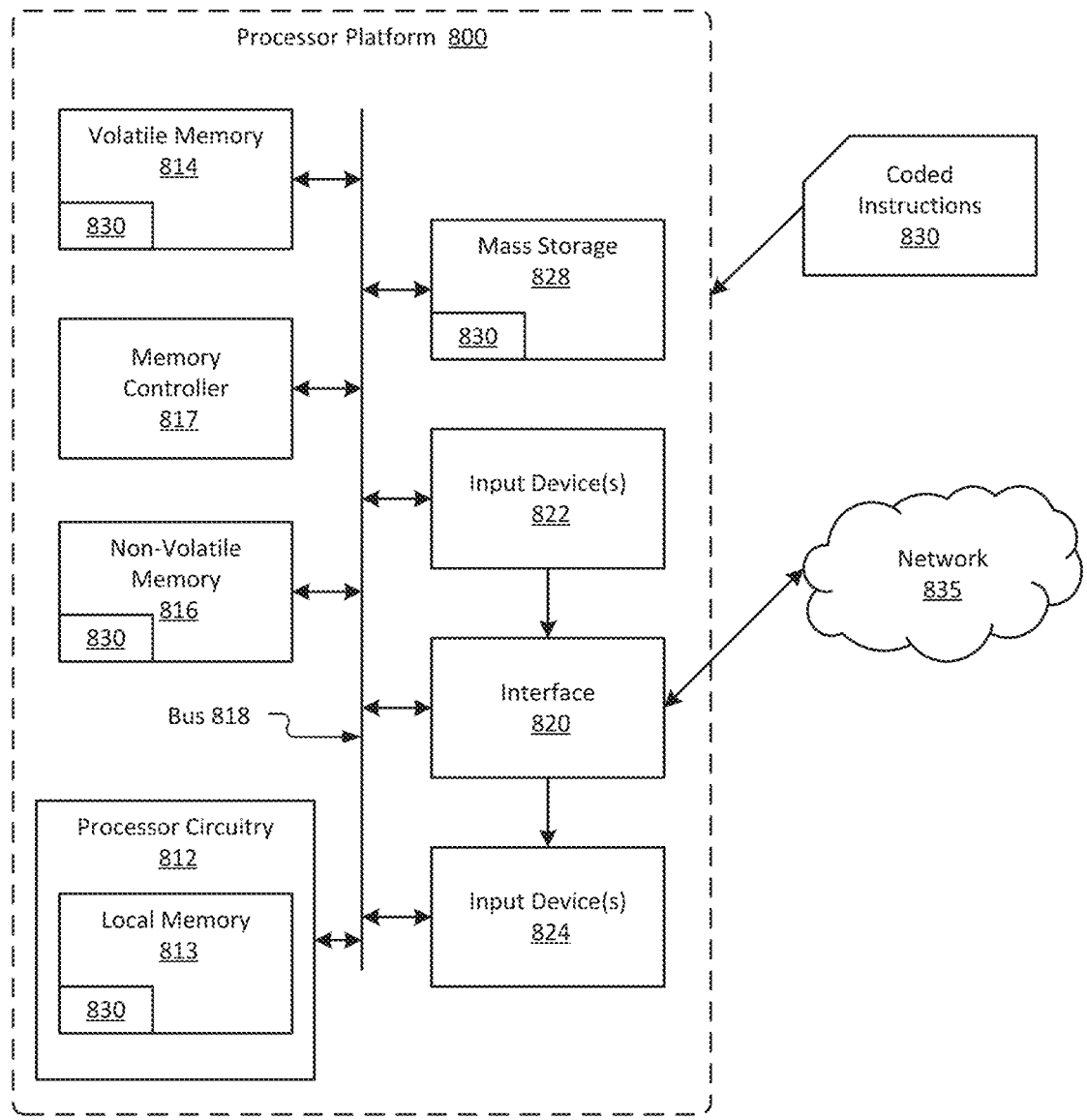
FIG. 8 is a block diagram of an example processor platform structured to execute the machine readable instructions or operations, according to some embodiments.

FIG. 8 is a block diagram of an example processor platform structured to execute the machine readable instructions or operations, according to some embodiments. As illustrated, a processor platform 800 can be, for example, a server, a personal computer, a workstation, a self-learning machine (e.g., a neural network), a mobile device (e.g., a cell phone, a smart phone, or a tablet), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), Dynamic Random Access Memory, and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 835. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 830, which may be implemented by the machine readable instructions of FIG. 7, may be stored in the mass storage device 828, in the volatile memory 814, in the non-volatile memory 816, and/or on a removable non-transitory computer readable storage medium such as a CD or DVD.

Figure 9:
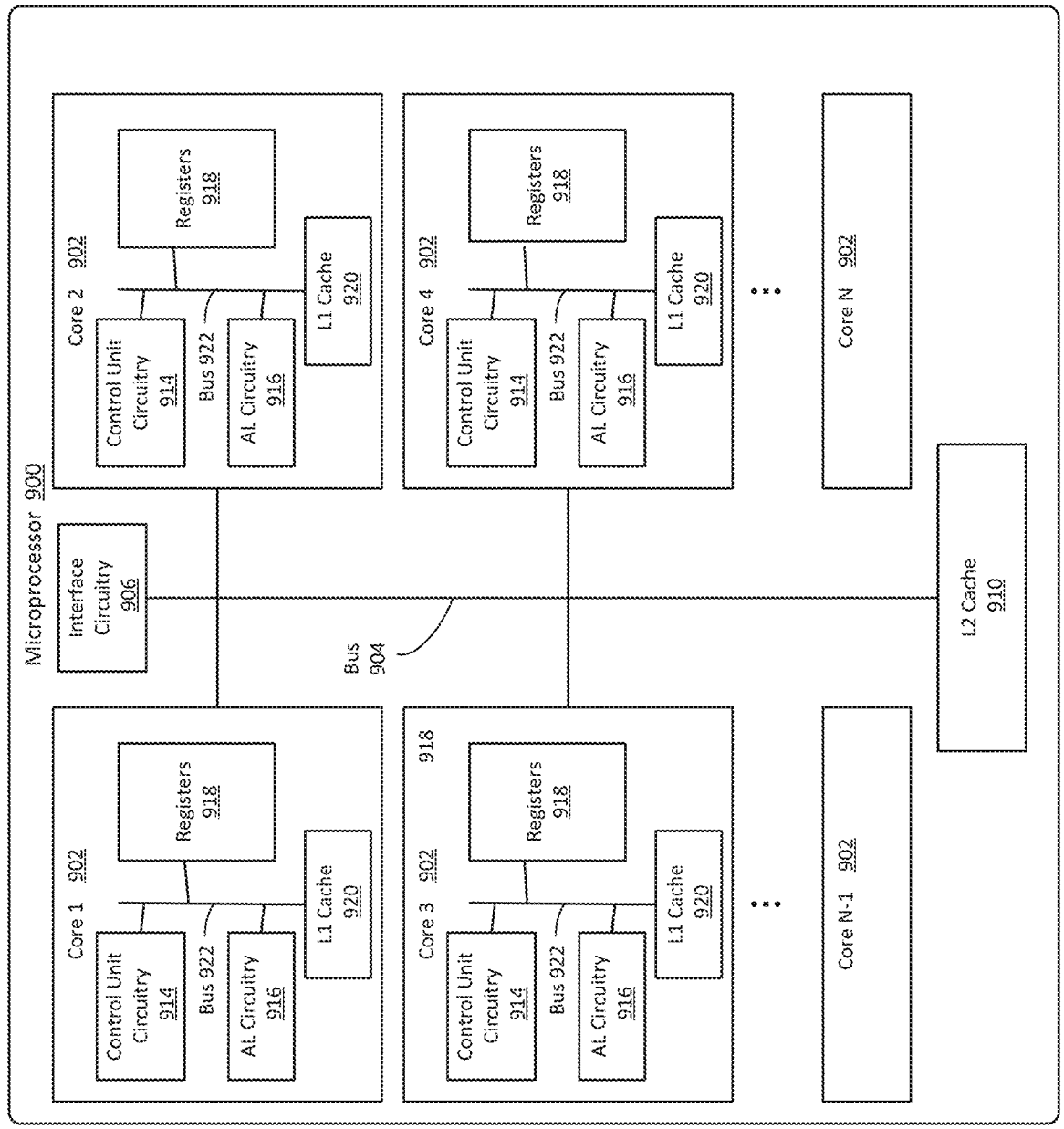
FIG. 9 is a block diagram of an example implementation of processor circuitry.

FIG. 9 is a block diagram of an example implementation of processor circuitry. In this example, the processor circuitry is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 6A and 6B.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2) cache) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory. Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 904 may implement at least one of an I2C bus, a SPI bus, a PCI bus, or a PCIe bus.

Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages.

The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
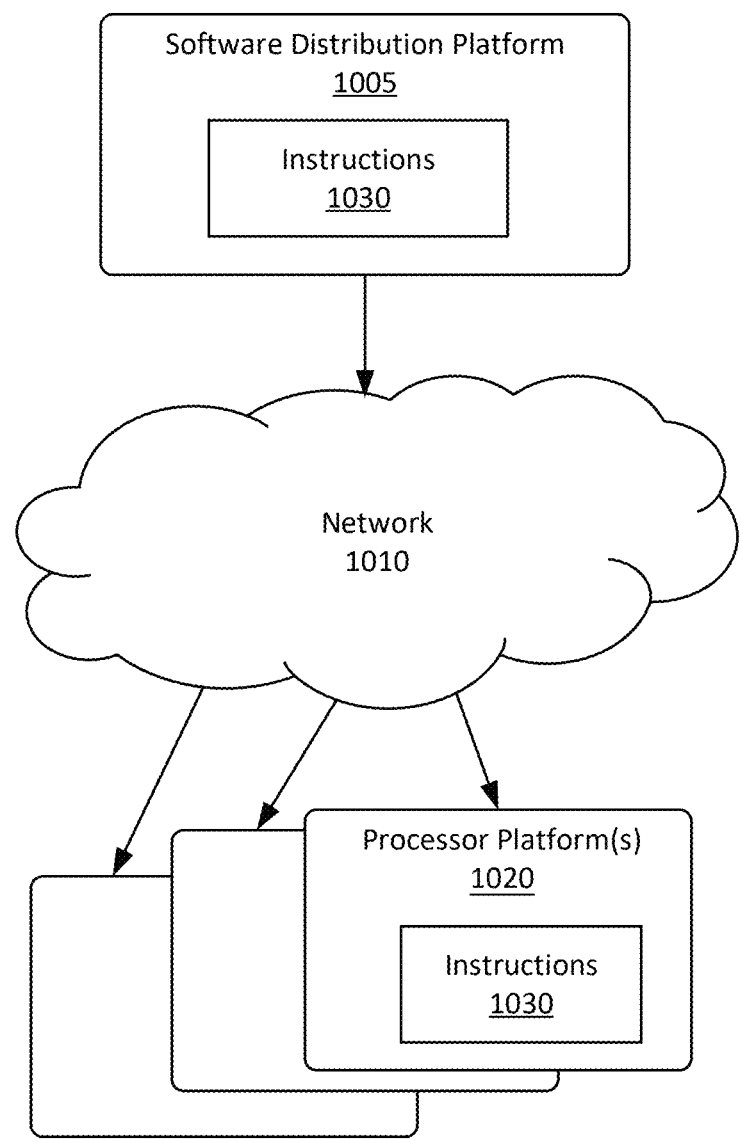
FIG. 10 is a block diagram illustrating an example software distribution platform.

FIG. 10 is a block diagram illustrating an example software distribution platform. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store machine readable instructions 1030.

The one or more servers of the example software distribution platform 1005 are in communication with a network 1010, which may correspond to any one or more of the Internet or other network. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1030 from the software distribution platform 1005 to processor platforms 1020. In some examples, one or more servers of the software distribution platform 1005 periodically offer, transmit, and/or force updates to the software to ensure improvements, patches, updates, etc., are distributed and applied to the software at the end user devices.

The following Examples pertain to certain embodiments:

In Example 1, a computer-readable storage medium comprising instructions that, when executed by a processor, cause the processor to: receive a storage request from an object management authority to store a version of a data object at a storage appliance; generate a hash value of the data object; store the data object in a scratchpad storage; transmit a verification request for the hash value of the data object to an object versioning authority; and upon receiving affirmative verification for the hash value, move the data object from the scratchpad storage to a media storage and transmit an acknowledgement to the object management authority.

In Example 2, the storage request includes the data object, an object identification, and a version number for the data object.

In Example 3, the storage medium further includes instructions that, when executed by the processor, cause the processor to, upon receiving the affirmative verification for the hash value, further updating an object versioning cache with the object identification, the version number for the data object, and the hash value.

In Example 4, the version of the data object is one of multiple versions of the data object.

In Example 5, the verification request is transmitted via an authenticated channel.

In Example 6, the verification request includes identification for the data object, version number for the data object, and the generated hash value.

In Example 7, the storage media further includes instructions that, when executed by the processor, cause the processor to, upon receiving a negative verification for the hash value, remove the data object from the scratchpad storage without storing the data object.

In Example 8, the storage media further includes instructions that, when executed by the processor, cause the processor to receive a storage request from the object management authority to store an update to a version of a second data object at the storage appliance; store the update in the scratchpad storage; copy the second data object from the storage media and store the copy of the second data object in the scratchpad storage; apply the update to the second data object to generate an updated data object; generate a hash value of the updated data object; transmit verification request for the hash value of the updated data object to the object versioning authority; and, upon receiving affirmative verification for the hash value, move the updated data object from the scratchpad storage to a media storage and transmit an acknowledgement to the object management authority.

In Example 9, an apparatus includes a versioning component to verify versions of one or more data objects; a scratchpad media for temporary storage; and an object media to store one or more data objects, wherein the apparatus is to receive a storage request from an object management authority to store a version of a data object at the apparatus; generate a hash value of the data object; store the data object in the scratchpad storage; transmit a verification request for the hash value of the data object to an object versioning authority; and upon receiving affirmative verification for the hash value, move the data object from the scratchpad storage to the media storage and transmit an acknowledgement to the object management authority.

In Example 10, the storage request includes the data object, an object identification, and a version number for the data object.

In Example 11, the apparatus further includes an object versioning cache, wherein the apparatus is further to, upon receiving the affirmative verification for the hash value, further updating the object versioning cache with the object identification, the version number for the data object, and the hash value.

In Example 12, the version of the data object is one of multiple versions of the data object.

In Example 13, the verification request is transmitted via an authenticated channel.

In Example 14, the verification request includes identification for the data object, version number for the data object, and the generated hash value.

In Example 15, the apparatus is further to, upon receiving a negative verification for the hash value, remove the data object from the scratchpad storage without storing the data object.

In Example 16, the apparatus is further to receive a storage request from the object management authority to store an update to a version of a second data object at the apparatus; store the update in the scratchpad storage; copy the second data object from the storage media and store the copy of the second data object in the scratchpad storage; apply the update to the second data object to generate an updated data object; generate a hash value of the updated data object; transmit verification request for the hash value of the updated data object to the object versioning authority; and upon receiving affirmative verification for the hash value, move the updated data object from the scratchpad storage to a media storage and transmit an acknowledgement to the object management authority.

In Example 17, the method further includes receiving a storage request from an object management authority to store a version of a data object at a storage appliance; generating a hash value of the data object; storing the data object in a scratchpad storage; transmitting a verification request for the hash value of the data object to an object versioning authority, the verification request includes identification for the data object, version number for the data object, and the generated hash value; upon receiving affirmative verification for the hash value, move the data object from the scratchpad storage to a media storage and transmit an acknowledgement to the object management authority; and upon receiving a negative verification for the hash value, remove the data object from the scratchpad storage without storing the data object.

In Example 18, the storage request includes the data object, an object identification, and a version number for the data object.

In Example 19, the method further includes, upon receiving the affirmative verification for the hash value, further updating an object versioning cache with the object identification, the version number for the data object, and the hash value.

In Example 20, the verification request is transmitted via an authenticated channel.

In Example 21, the method further includes, receiving a storage request from the object management authority to store an update to a version of a second data object at the storage appliance; storing the update in the scratchpad storage; copying the second data object from the storage media and storing the copy of second data object in the scratchpad storage; applying the update to the second data object to generate an updated data object; generating a hash value of the updated data object; transmitting verification request for the hash value of the updated data object to the object versioning authority; and, upon receiving affirmative verification for the hash value, moving the updated data object from the scratchpad storage to a media storage and transmitting an acknowledgement to the object management authority.

In Example 22, an apparatus includes means for receiving a storage request from an object management authority to store a version of a data object at a storage appliance; means for generating a hash value of the data object; store the data object in a scratchpad storage; means for transmitting a verification request for the hash value of the data object to an object versioning authority; and means for moving the data object from the scratchpad storage to a media storage and transmitting an acknowledgement to the object management authority upon receiving affirmative verification for the hash value.

In Example 23, the storage request includes the data object, an object identification, and a version number for the data object.

In Example 24, the apparatus further includes means for updating an object versioning cache with the object identification, the version number for the data object, and the hash value upon receiving the affirmative verification for the hash value.

In Example 25, the version of the data object is one of multiple versions of the data object.

In Example 26, the verification request is transmitted via an authenticated channel.

In Example 27, the verification request includes identification for the data object, version number for the data object, and the generated hash value.

In Example 28, the apparatus further includes means for removing the data object from the scratchpad storage without storing the data object upon receiving a negative verification for the hash value.

In Example 29, the apparatus further includes means for receiving a storage request from the object management authority to store an update to a version of a second data object at the storage appliance; means for storing the update in the scratchpad storage; means for copying the second data object from the storage media and storing the copy of the second data object in the scratchpad storage; means for applying the update to the second data object to generate an updated data object; means for generating a hash value of the updated data object; means for transmitting verification request for the hash value of the updated data object to the object versioning authority; and means for moving the updated data object from the scratchpad storage to a media storage and transmitting an acknowledgement to the object management authority upon receiving affirmative verification for the hash value.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. A non-transitory computer-readable storage medium containing instructions that, when executed by a processor, cause the processor to:
   receive a storage request for a data object from an object management authority;
   for a storage request to store a version of the data object at a storage appliance:
     generate a hash value of the data object, and
     store the data object in a scratchpad storage;
   for a request to store an update to a version of the data object at the storage appliance:
     store the update in the scratchpad storage,
     copy the data object from the storage appliance and store the copy of the data object in the scratchpad storage,
     apply the update to the data object to generate an updated data object, and
     generate a hash value of the updated data object;
   transmit a verification request for the hash value of the data object or updated data object to an object versioning authority; and
   upon receiving affirmative verification for the hash value, move the data object or updated data object from the scratchpad storage to the storage appliance and transmit an acknowledgement to the object management authority.

2. The non-transitory computer-readable storage medium of claim 1, wherein the storage request includes the data object, an object identification, and a version number for the data object.

3. The non-transitory computer-readable storage medium of claim 2, further comprising instructions that, when executed by the processor, cause the processor to:
   upon receiving the affirmative verification for the hash value, further updating an object versioning cache with the object identification, the version number for the data object, and the hash value.

4. The non-transitory computer-readable storage medium of claim 2, wherein the version of the data object is one of multiple versions of the data object.

5. The non-transitory computer-readable storage medium of claim 1, wherein the verification request is transmitted via an authenticated channel.

6. The non-transitory computer-readable storage medium of claim 1, wherein the verification request includes identification for the data object, version number for the data object, and the generated hash value.

7. The non-transitory computer-readable storage medium of claim 1, further containing instructions that, when executed by the processor, cause the processor to:
   upon receiving a negative verification for the hash value, remove the data object or updated data object from the scratchpad storage without storing the data object or updated data object.

8. An apparatus comprising:
   a processor including circuitry to verify versions of one or more data objects;
   a scratchpad media for temporary storage; and
   a storage appliance to store one or more data objects, wherein the apparatus is to:
     receive a storage request for a data object from an object management authority;
     for a storage request to store a version of the data object at the storage appliance:
       generate a hash value of the data object, and
       store the data object in the scratchpad storage;
     for a request to store an update to a version of the data object at the storage appliance:
       store the update in the scratchpad storage,
       copy the data object from the storage appliance and store the copy of the data object in the scratchpad storage,
       apply the update to the data object to generate an updated data object, and
       generate a hash value of the updated data object;
     transmit a verification request for the hash value of the data object or updated data object to an object versioning authority; and
     upon receiving affirmative verification for the hash value, move the data object or updated data object from the scratchpad storage to the storage appliance and transmit an acknowledgement to the object management authority.

9. The apparatus of claim 8, wherein the storage request includes the data object, an object identification, and a version number for the data object.

10. The apparatus of claim 9, further comprising an object versioning cache, wherein the apparatus is further to:
   upon receiving the affirmative verification for the hash value, further updating the object versioning cache with the object identification, the version number for the data object, and the hash value.

11. The apparatus of claim 9, wherein the version of the data object is one of multiple versions of the data object.

12. The apparatus of claim 8, wherein the verification request is transmitted via an authenticated channel.

13. The apparatus of claim 8, wherein the verification request includes identification for the data object, version number for the data object, and the generated hash value.

14. The apparatus of claim 8, wherein the apparatus is further to:
   upon receiving a negative verification for the hash value, remove the data object or updated data object from the scratchpad storage without storing the data object or updated data object.

15. A method comprising:
   receiving a storage request for a data object from an object management authority;
   for a storage request to store a version of the data object at a storage appliance:
      generating a hash value of the data object, and
      storing the data object in a scratchpad storage;
   for a request to store an update to a version of the data object at the storage appliance:
      storing the update in the scratchpad storage,
      copying the data object from the storage appliance and storing the copy of the data object in the scratchpad storage,
      applying the update to the data object to generate an updated data object, and
      generating a hash value of the updated data object;
   transmitting a verification request for the hash value of the data object or updated data object to an object versioning authority; and
   upon receiving affirmative verification for the hash value, move the data object or updated data object from the scratchpad storage to the storage appliance and transmit an acknowledgement to the object management authority.

16. The method of claim 15, wherein the storage request includes the data object, an object identification, and a version number for the data object.

17. The method of claim 16, further comprising:
   upon receiving the affirmative verification for the hash value, further updating an object versioning cache with the object identification, the version number for the data object, and the hash value.

18. The method of claim 17, wherein the verification request is transmitted via an authenticated channel.

19. The method of claim 15, wherein the verification request includes identification for the data object, version number for the data object, and the generated hash value.

20. The method of claim 15, further comprising:
   upon receiving a negative verification for the hash value, removing the data object or updated data object from the scratchpad storage without storing the data object or updated data object.

* * * * *